United States Patent [19]

Keyser et al.

[11] Patent Number: 4,776,985
[45] Date of Patent: Oct. 11, 1988

[54] ALKOXYLATED ROSIN AMIDES

[75] Inventors: Gene E. Keyser, Savannah, Ga.; Gary D. Fultz, The Woodlands, Tex.

[73] Assignee: Union Camp Corporation, Wayne, N.J.

[21] Appl. No.: 707,660

[22] Filed: Mar. 4, 1985

[51] Int. Cl.$^4$ ............................................... C09F 5/00
[52] U.S. Cl. ................................................... 260/404
[58] Field of Search ......................................... 260/404

[56] References Cited

U.S. PATENT DOCUMENTS 2,083,221  6/1937  De Groote ........................... 260/404

FOREIGN PATENT DOCUMENTS 1301816  8/1969  Fed. Rep. of Germany ...... 260/404

Primary Examiner—Charles F. Warren
Assistant Examiner—Elizabeth A. Hanley
Attorney, Agent, or Firm—Edward J. Sites

[57] ABSTRACT

Ethylene and propylene oxide adducts of rosin amides are novel compositions of matter useful for the protection of metal from corrosiion and useful as surface active agents for the emulsification and demulsification of multi-phase liquid systems. These compounds are prepared by the addition of ethylene or propylene oxide (or mixture of the two) under moderate pressures and temperatures, with or without catalysts, to the starting rosin amides.

7 Claims, No Drawings

ALKOXYLATED ROSIN AMIDES

BACKGROUND OF THE INVENTION

1. Field of the Invention

The invention relates to alkoxylated rosin amides and methods of their preparation.

2. Summary of the Invention

The invention comprises alkoxylated amino - and polyamino - amides of rosin. The compounds of the invention are useful as surface-active agents for the emulsification and demulsification of multi-phase liquid systems and as inhibitors of metal corrosion.

The term "rosin" is employed herein to mean the naturally occurring resinous material, which is a complex mixture of about 90 percent resin acids and about 10 percent or less neutral compounds. The resin acids comprise chiefly abietic acid and its isomers. Representative of rosin are wood rosin, gum rosin and tall oil rosin. Also included within the meaning of "rosin" as used herein are modified rosins such as hydrogenated, dehydrogenated, disproportionated and dimerized rosins.

DETAILED DESCRIPTION OF THE PREFERRED EMBODIMENTS OF THE INVENTION

The adducts of the invention are the reaction products of alkylene oxides such as ethylene or propylene oxide and the rosin amides of poly(ethyleneamine). The addition of the alkylene oxides to the rosin amides may be carried out by heating mixtures of the reactants to a temperature of from about 50° to 250° C., preferably circa 150° C., under pressures of from about 25 to about 1,000 psig, preferably about 100 psig.

The proportion of reactants heated together may vary over a wide range, i.e., in a ratio of 1 to 10 moles of alkylene oxide/amine equivalent. The proportion of alkylene oxide added affects the physical properties of the product of the invention as will be described hereinafter.

The desired reaction may be catalysed, if desired, by a presence of a catalytic proportion of an alkali earth metal salt. A catalytic proportion is generally within the range of from 0.1 to 5 percent by weight of the reaction mixture.

The addition reaction is generally complete within about 4 to 10 hours and may be observed by the cessation of alkylene oxide consumption.

The alkylene oxides employed in the preparation of the compounds of the invention are well known compounds as are methods of their preparation.

The rosin amides are likewise generally well known compounds. Typically, rosin amides are prepared by reacting the rosin with 5 to 10 molar excesses of amines at temperatures in excess of 250° C. and pressures of 50 to 1000 psi. The organic amines employed as reactants are any possessive of a labile hydrogen atom bonded to the nitrogen atom. These include, but are not limited to, aliphatic mono amines such as butylamine, octylamine, octadecyl amine, aromatic amines such as aniline and beta-naphthylamine, arlalkyl amines such as n-ethylaniline and 2-phenylethylamine, and polyamines such as ethylene diamine, diethylene triamine, tetraethylene pentamine, hexamethylene diamine, poly(ethyleneimine), piperazine and n-aminoethylpiperazine.

The rosin amides preferred as reactants in the preparation of the compounds of the present invention are the reactive products of rosin and a poly(ethyleneamine). Representative of the most preferred rosin amides are the adducts of rosin and diethylene triamine, triethylene tetraamine, tetraethylene pentamine and the like. The adduct of rosin and ethylene diamine is also preferred.

The following examples show the manner and the process of making and using the invention and set forth the best mode contemplated by the inventors for carrying out the invention.

Preparation 1

To rosin acids (Union Camp's Unitol® NCY, 1 mole) is added tetraethylene pentamine (1 mole) at a temperature of 150° C. To this mixture are added Neodol® 23 (Shell Chemical's $C_{12}$–$C_{13}$ acohol, 2% by weight) and technical grade xylene (3% by weight). The clear solution is heated to a temperature of 260° C. while removing water-xylene azeotrope with xylene being returned to the reaction mixture. After three hours at 260° C. the measured acid number of the reaction mixture is 10 mg. KOH per gram of sample and water in slight excess of theoretical (due to amine contamination) has been removed. The reaction mixture is then subjected to a vacuum of 26 to 28 inches of Hg for a period of 30 minutes to remove residual xylene and residual unreacted amine, giving a product which is a clear amber semi-solid, Gardner color 10 to 15, having an amine number of 200 and an acid number 10.

Preparation 2

The procedure of Preparation 1, supra, was repeated except that the tetraethylene pentamine as used therein was replaced with an equivalent proportion of triethylene tetraamine to obtain a product with an amine equivalent weight of 280.

Example 1

A rosin amide (2800 parts) of triethylene tetramine and tall oil rosin prepared in accordance with Preparation 2, supra, was charged to a stirred autoclave and heated to 150° C. Ethylene oxide (liquid, 220 parts, 5 moles) was added to the autoclave with the aid of nitrogen at such a rate so as to maintain a pressure of 100 psi. After a period of 8 hours, all of the ethylene oxide had been added and consumed to give a compound having an average amine equivalent weight of 500, as demonstrated by gel permeation chromatography and by titration of the amine functionality. The material was a dark viscous liquid of 100,000 cps, dispersible in water, soluble in isopropanol, and soluble in aromatic solvents.

Example 2

A rosin amide (200 parts) of tetraethylene pentamine and tall oil rosin prepared in accordance with Preparation 1, supra, to an autoclave and heated to 150° C. Ethylene oxide (liquid, 220 parts, 5 moles) was added to the autoclave with the aid of nitrogen at such a rate so as to maintain a pressure of 100 psi. After a period of 6 hours, all of the ethylene oxide had been added and consumed to give a compound having an average amine equivalent weight of 420, as demonstrated by gel permeation chromatography and by titration of the amine functionality. The material was a dark viscous liquid of 20,000 cps, soluble in water, soluble in isopropanol and soluble in aromatic solvents.

The adducts obtained in the Examples 1 and 2, supra, are useful for the inhibition of corrosion of metals, particularly the inhibition of hydrochloric acid attack on mild steel. Using acceptable treatment levels of 10–4000 ppm under ambient temperature and pressure, mild steel is protected to a greater than 85–95% level against the action of 15, 20 or 37% hydrochloric acid for 24 hours. At elevated temperatures of up to 115° C., the protection is decreased to 70–90% at the same treatment levels.

The adduct compounds of the invention range in solubility in proportion to the amount of alkylene oxide added. The lower levels of ethoxylation, less than 3 moles/amine equiv., are easily dispersible in neutral and alkaline aqueous media and soluble in aqueous acidic media. The higher level, more than 8 moles/amine equiv., are water soluble. The water dispersibility or solubility of adducts of 3–8 moles of ethylene oxide is affected by the starting rosin amide moiety, as is the retention of solubility in aromatic solvents of all of the compounds. This characteristic makes these compounds attractive as surfactants useful for emulsification or demulsification of multi-phase systems, particularly mixtures brine solutions and petroleum fractions of various densities and aromatic contents.

Preferred compounds of the invention are those wherein the alkoxy units are present in a ratio of 1–20:1 to the amide amine functionality, preferably 1–5:1.

What is claimed is:

1. Alkoxylated amino- and polyamino amides of rosin prepared by the reaction of from 1 to 10 moles of an alkylene oxide per amine equivalent of an amino- or polyamino amide of rosin prepared by the reaction of rosin with from 5 to 10 molar excess of an amine.
2. The compounds of claim 1 containing a ratio of alkoxy units to aminoamide amine functionality of from 1–20:1.
3. The compounds of claim 1 wherein the aminoamide is a poly(ethyleneamine).
4. The compound of claim 3 wherein the poly(ethyleneamine) is ethylene diamine.
5. The compound of claim 4 wherein the ratio of alkoxy units to aminoamide amine functionality is from 1–5:1.
6. The compound of claim 1 prepared by the reaction of an alkylene oxide with the amino - or polyamino amide of rosin in the presence of an alkaline earth salt.
7. The compound of claim 6 wherein the alkylene oxide is selected from the group consisting of ethylene oxide and propylene oxide.

* * * * *